US012112657B2

(12) United States Patent
Lamb et al.

(10) Patent No.: US 12,112,657 B2
(45) Date of Patent: Oct. 8, 2024

(54) ZIPPERED LABEL-LINER COMBINATION

(71) Applicant: Iconex LLC, Duluth, GA (US)

(72) Inventors: Shane Lamb, Bulls Gap, TN (US); Timothy Darren Livingston, Corryton, TN (US)

(73) Assignee: Iconex LLC, Duluth, GA (US)

( * ) Notice: Subject to any disclaimer, the term of this patent is extended or adjusted under 35 U.S.C. 154(b) by 41 days.

(21) Appl. No.: 17/673,693

(22) Filed: Feb. 16, 2022

(65) Prior Publication Data

US 2023/0260429 A1 Aug. 17, 2023

(51) Int. Cl.
*G09F 3/00* (2006.01)
*G09F 3/02* (2006.01)
*G09F 3/10* (2006.01)

(52) U.S. Cl.
CPC .... *G09F 3/0288* (2013.01); *G09F 2003/0201* (2013.01); *G09F 2003/0222* (2013.01); *G09F 2003/0257* (2013.01); *G09F 2003/0267* (2013.01); *G09F 3/10* (2013.01)

(58) Field of Classification Search
None
See application file for complete search history.

(56) References Cited

U.S. PATENT DOCUMENTS

| | | | | |
|---|---|---|---|---|
| 5,716,688 | A * | 2/1998 | Burke | G09F 3/0288 283/105 |
| 5,722,538 | A | 3/1998 | Neely et al. | |
| 6,016,618 | A | 1/2000 | Attia et al. | |
| 2007/0211135 | A1 | 9/2007 | Moreland et al. | |
| 2012/0234481 | A1 | 9/2012 | Raming | |
| 2016/0365011 | A1 | 12/2016 | Davis et al. | |
| 2018/0154675 | A1 | 6/2018 | Raming | |
| 2018/0225997 | A1 | 8/2018 | Raming | |

FOREIGN PATENT DOCUMENTS

| | | |
|---|---|---|
| WO | 2023158964 | 8/2023 |
| WO | WO-2023158964 A1 | 8/2023 |

* cited by examiner

*Primary Examiner* — Alexander S Thomas
(74) *Attorney, Agent, or Firm* — Schwegman Lundberg & Woessner, P.A.

(57) ABSTRACT

A label-liner combination is provided. A liner substrate is segmented into three portions by horizontal die cut ties made in the liner substrate. The three portions comprise a top portion, a liner tear strip, and a bottom portion. A label substrate is segmented into three portions by perforations a border portion, a label tear strip, and a center portion. A front side of the liner substrate is aligned with a backside of the label substrate such that the liner tear strip aligns within the label tear strip, the bottom portion of the liner substrate aligns with the center portion of the label substrate, and the top portion of the liner substrate is aligned above and below a top perforation for the label tear strip.

6 Claims, 8 Drawing Sheets

PRIOR ART

PRIOR ART

PRIOR ART

ZIPPERED LABEL-LINER COMBINATION

BACKGROUND

Label-liner combinations are useful in many different industries. These types of labels are particularly useful for shipping, such as when a front side of a label is imaged with a shipping address and the backside of the label (affixed to a liner) comprises a packing slip for the items being shipped in a package upon which the label-liner combination is adhered to.

Two-sided (2S) labels are useful for shipping and other applications, One type of 2S label consists of a label substrate with a smaller liner substrate centered on the back of the label substrate. Perforations (die cuts) in the label substrate and liner substrate permit a framed portion of the label substrate to be separated with a the liner substrate leaving a border. The perforated border comprises adhesive on the backside of the label substrate such that the combination can be adhered to a package and then separated by the recipient with no adhesive between the framed portion of the label substrate and the corresponding liner to reveal the indicia imaged on the backside of the label substrate (such as a packing slip). 2S label combinations are difficult to separate from the package even with the perforations prefabricated in both the label and liner substrates.

As a result, 2S zipper labels emerged in the industry for purposes of providing a better manner in which the framed portion corresponding to the liner could be separated by a recipient.

With a 2S zipper label a zipper perforation is manufactured in both the label substrate and the liner substrate. The liner substrate only covers a portion of the backside of the label substrate creating a border on the backside of the label substrate upon which adhesive is coated so that the label-liner combination can be adhered to a package for shipping (similar to the 2S border label discussed above). The zipper perforation allows the recipient of the package to tear through both the label substrate in one direction all the way across the combination and remove both a portion of the label substrate and the liner substrate. Additional perforations that outline the liner substrate are made through the label substrate allowing the label portion corresponding to the label substrate and the liner substrate to be separated free of adhesive with the border portion of the label substrate remaining affixed to the package.

Current designs associated with 2S zipper labels are defective and unreliable for a number of reasons. For instance, current 2S zipper-based label-liner combinations are unreliable during manufacture, the label substrate zipper and corresponding liner substrate zipper (perforations or die cuts) do not provide sufficient web strength (in the label-liner combination) and separate (break) from press tension during manufacture. Press operators attempt to overcome these problems by backing off (lowering) the die pressure when making the zippers in the substrates to increase the tension tolerance in the combination for proper press operation. However, these changes result in defective zipper labels that frequently tear and damage when recipients attempted to remove the zippers. Thus, by making the 2S zipper-based label-liner combinations press tolerant during manufacture, the combinations are defective for their intended use and benefit.

SUMMARY

In various embodiments, two-sided (2S) zipper label-liner combinations are provided that do not suffer from the above-mentioned flaws associated with existing 2S zipper label-liner combinations.

In an embodiment, a label-liner combination is provided. The label-liner combination comprises a liner substrate and a label substrate. The liner substrate comprises two horizontal die cut ties that define a top portion of the liner substrate, a bottom portion of the liner substrate, and a liner tear strip that separates the top portion from the bottom portion. The label substrate comprising two horizontal perforations that define a label tear strip and two or more additional die cuts corresponding to an outline of three sides of the bottom portion of the liner substrate. A top set of the two horizontal die cuts sits under a top one of the two horizontal perforations. A bottom set of the two horizontal dies cuts sits above a bottom one of the two horizontal perforations.

DETAILED DESCRIPTION

Figure 1A:
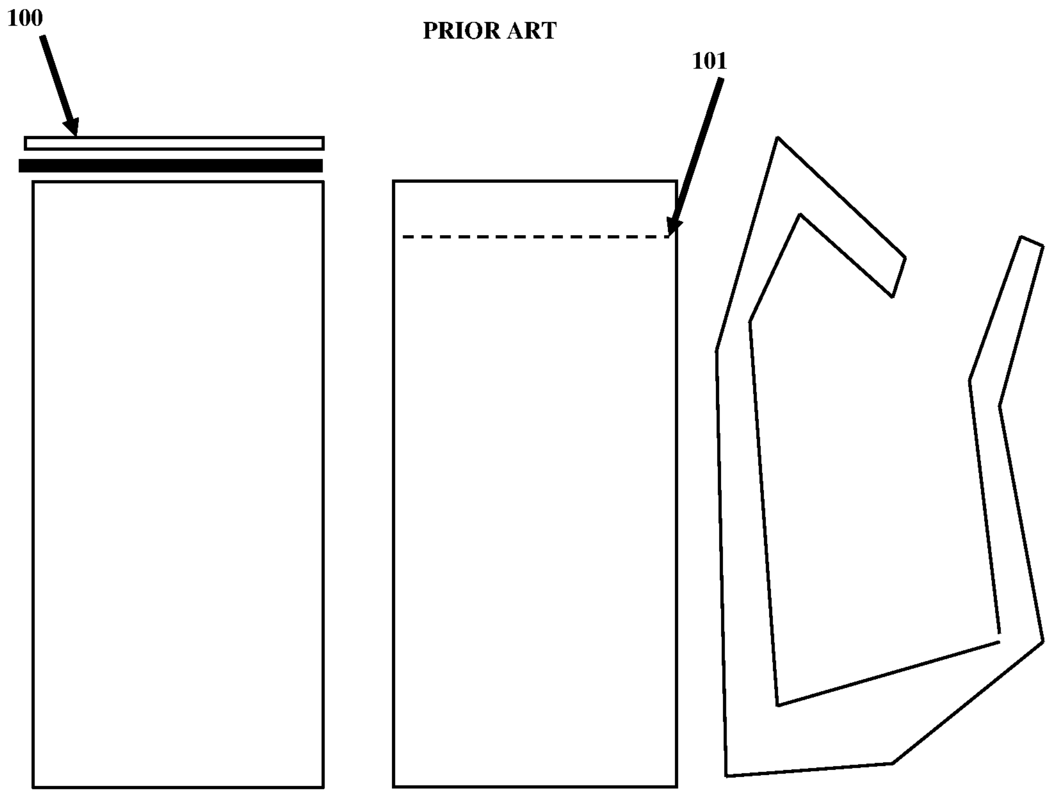
FIG. 1A is a diagram of a prior art two-sided (2S) border-based label-liner combination depicting an original combination, a separated inner portion, and the remaining border portion.

FIG. 1A is a diagram of a two-sided (2S) label-liner combination 100 depicting an original combination (far left image in FIG. 1A), a separated inner portion (middle image in FIG. 1A), and the remaining border portion (far right image in FIG. 1A). Typically, adhesive is coated on the backside of the label substrate that corresponds to the border (far right image in FIG. 1A). The border portion is then adhered to a package. A recipient then attempts to punch through the perforations defining the center portion and carefully tear out the inner/center portion (middle image in FIG. 1A). Because the backside of the center portion lacks any adhesive, the recipient can separate the liner and obtain the printed indicia on the backside of the center portion (middle image in FIG. 1A). These 2S border-based label-liner combinations are difficult to properly separate; thus, the preferred approach is a 2S zipper-based label-liner combination as is depicted and discussed below with FIGS. 1B-1E.

This type of 2S label-liner combination as shown in FIG. 1A may also include a zipper that tears across and may or may not tear completely across the combination 100. A faint zipper 101 is identifiable in FIG. 1A to illustrate this arrangement and is labeled 101 (zipper 101 extends just beyond an outer edge of the combination 100 in FIG. 1A). This suffers from the same manufacture and usability issues as does a typical 2S zipper-based label-liner combination (discussed below with FIGS. 1B-1D).

Figure 1B:
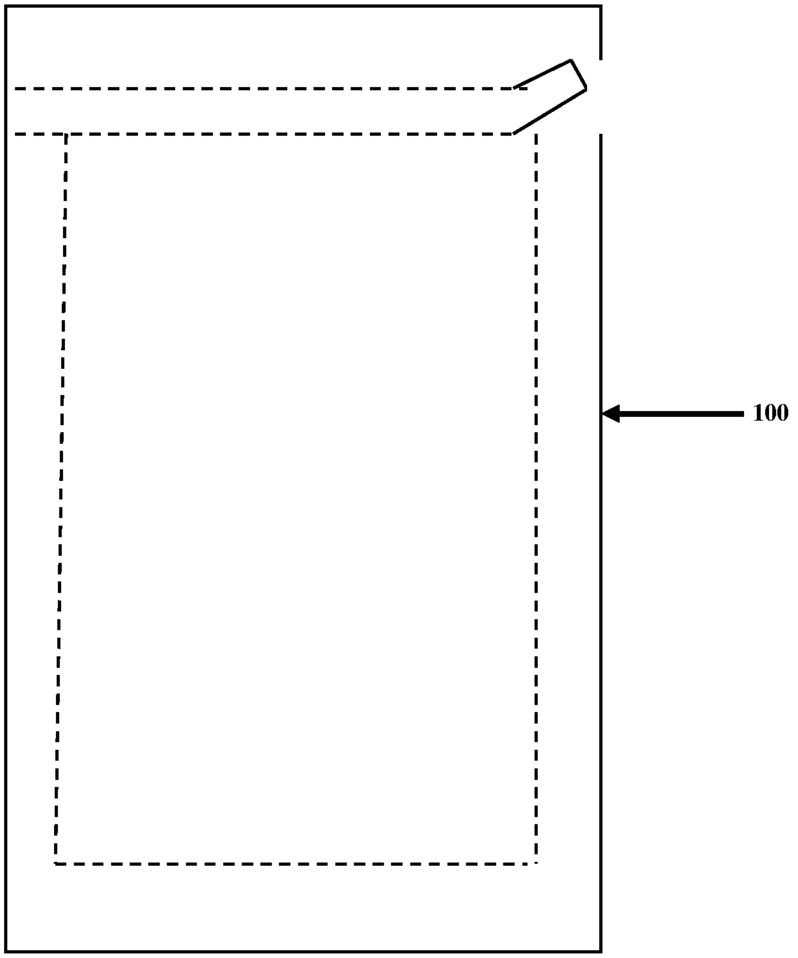
FIG. 1B is a diagram of a prior art 2S zipper label-liner combination depicting the zipper portion of the combination.
Figure 1C:
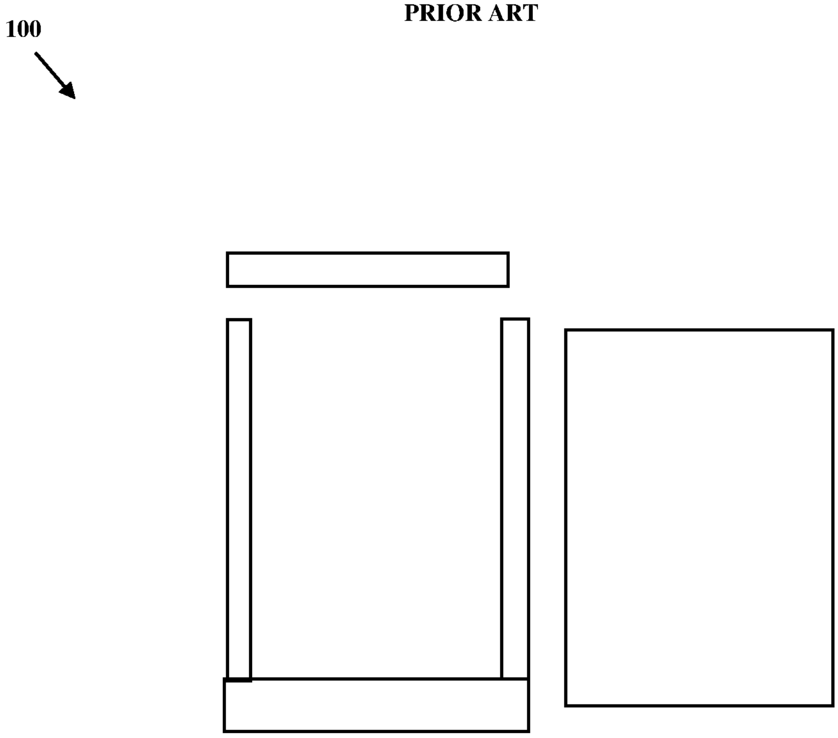
FIG. 1C is a diagram of a prior art 2S zipper label-liner combination depicting a remaining border portion of the combination and a separated inner portion of the combination with the zipper tear strip discarded and not shown in FIG. 1C.

FIG. 1B is a diagram of a prior art 2S zipper label-liner combination 100 depicting the zipper portion of the combination 100. The zipper portion is comprised of both the label substrate and the liner substrate. A recipient tears the zipper portion off in a noted direction. Once the zipper portion has been "opened" or removed from the combination 100, the center portion can be removed by the recipient (depicted in FIG. 1C, far left image is the border portion that remains on the package, the center portion is shown in the far-right image, and the zipper portion (or tear strip) has been discarded and not shown in FIG. 10).

Figure 1D:
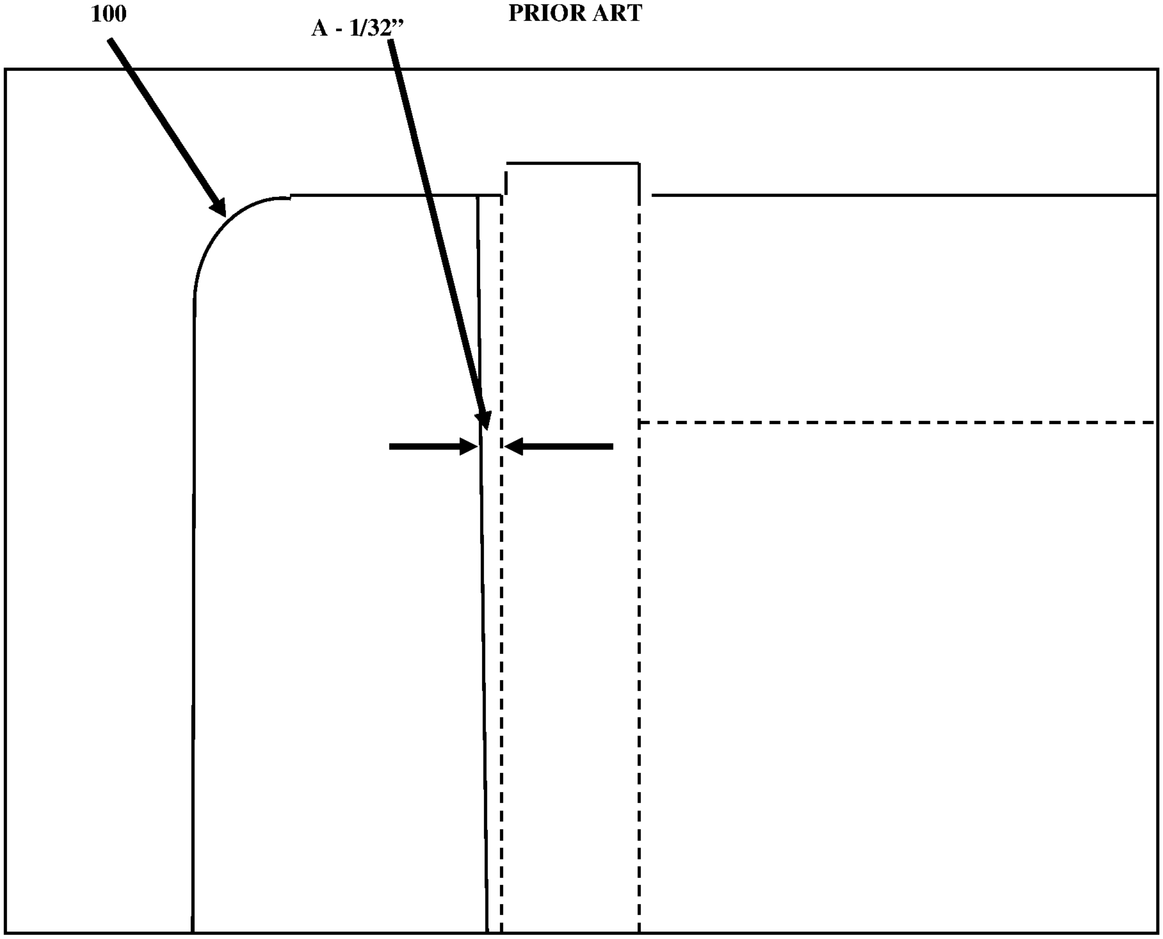
FIG. 1D is a diagram of a prior art 2S zipper label-liner combination depicting a distance between a perforation in the label portion of the combination for a zipper (tear away portion) and an offset perforation made in the liner portion of the combination.

FIG. 1D is a diagram of a prior art 2S zipper label-liner combination 100 depicting a distance between a perforation in the label portion of the combination 100 for a zipper (tear away portion) and an offset perforation made in the liner portion of the combination 100.

As noted in the FIG. 10 the offset between the perforation in the label substrate for the top of the zipper and the corresponding perforation in the liner substrate is 1/32 of an inch (illustrated by the ruler and the two-side way arrows with the arrow labeled "A" in FIG. 1D). This does not allow for enough tensile strength in the combination 100 and causes the combination to separate along the perforations under minimal press tension during manufacture of the combination 100 (this separation during press operation is shown in FIG. 1E).

Figure 1E:
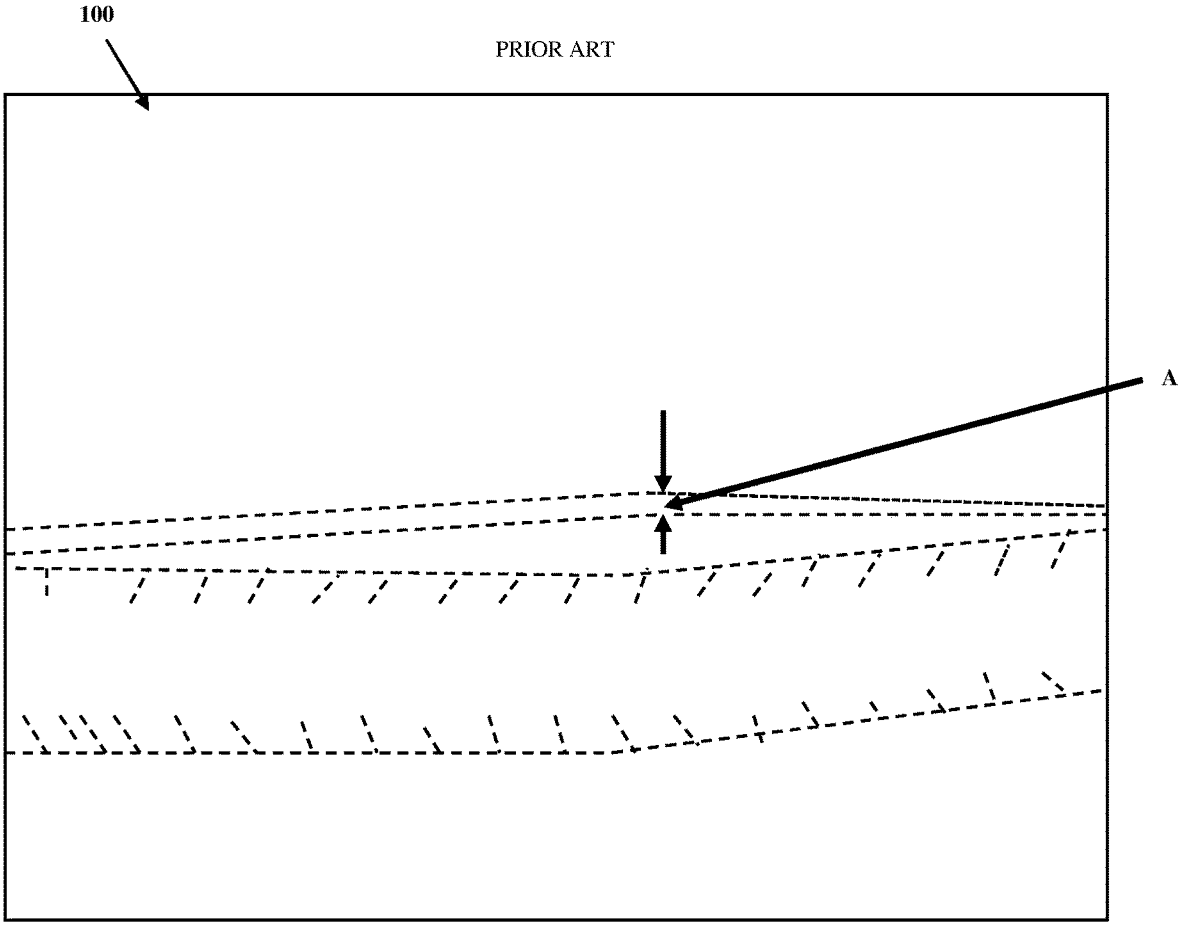
FIG. 1E is a diagram depicting a prior art 2S zipper label-liner combination that separated along the zipper during press manufacture because the distance (illustrated in FIG. 1D) was too small between the perforation in the label portion and the offset perforation made in the liner portion causing a defect in the combination during operation of the press.

FIG. 1E is a diagram depicting a prior art 2S zipper label-liner combination 100 that separated along the zipper during press manufacture because the distance (illustrated in FIG. 1D by "A")) was too small between the perforation in the label portion and the offset perforation made in the liner portion causing a defect in the combination 100 during operation of the press. As noted above, press operated tried to overcome this defect by decreasing the perforation strength to increase the web or combination 100 strength during operation of the press so that the combination 100 would not separate. However, this made the combination 100 unusable and would resulting in tearing of the center portion in the label substrate when recipients attempted to remove the zipper portion.

Figure 2A:
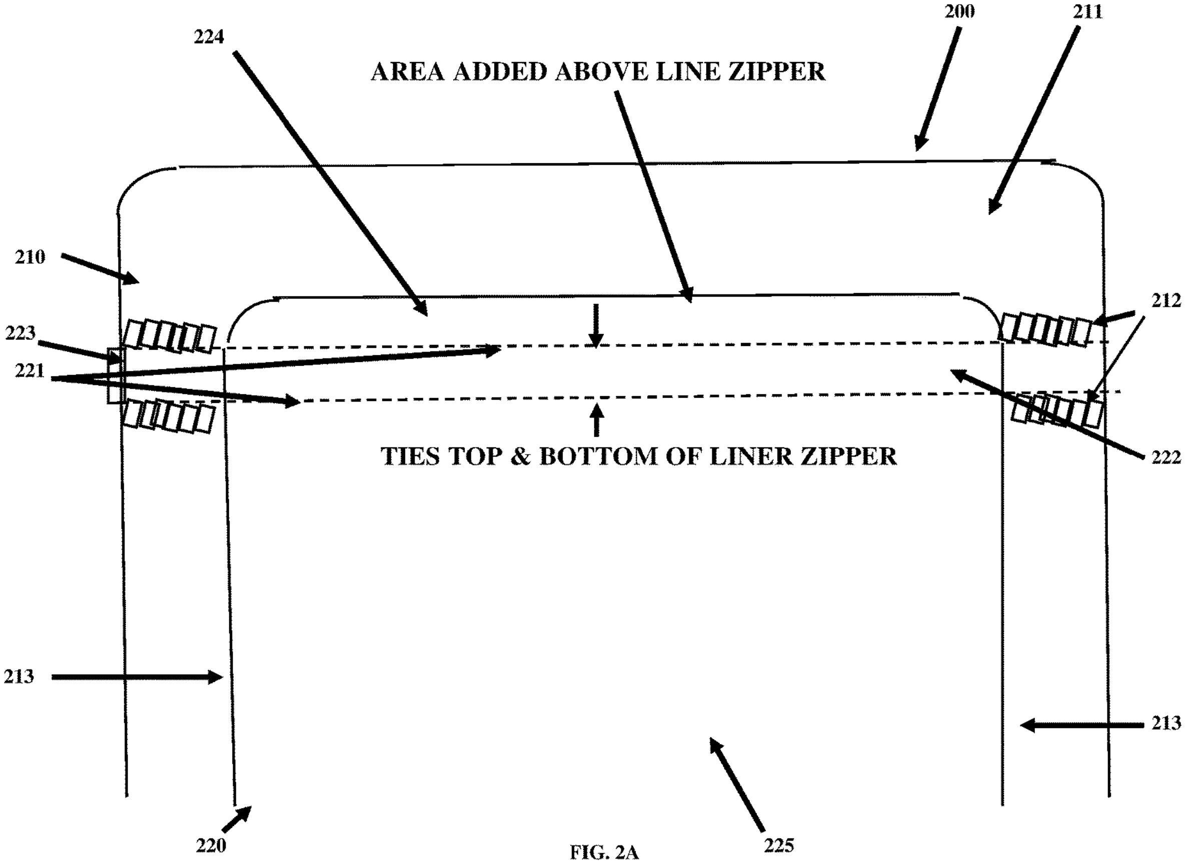
FIG. 2A is a diagram of a 2S zipper label-liner combination, according to an example embodiment.

FIG. 2A is a diagram of a 2S zipper label-liner combination 200, according to an example embodiment. It is noted that combination 200 is shown only with the components necessary for understanding the illustrated embodiments, other components may be present such as coatings of adhesive, release coatings, terminal imaging coatings, etc. without departing from the present teachings of a novel 2S zipper-label-liner combination 200. Moreover, the dimensions of the various components can be changed without departing from the present teachings.

2S zipper label-liner combination 200 comprises a label substrate 210 and a liner substrate 220.

Label substrate 210 comprises a border portion 211, zipper or tear strip perforations 212 defining a tear strip (zipper), and perforations corresponding to 3 sides of the label substrate 213 (just 2 of the 3 sides illustrated in FIG. 2A).

Liner substrate 220 comprises ties (die cuts or perforations with breaks in between them) 221 corresponding to the tear strip perforations 212 for the tear strip in the label substrate 210 and defining a liner tear strip 222, an end portion 223 of the liner tear strip 222 that extends beyond an outer edge of the label substrate 210, a top portion 224 of the liner substrate 220 that extends above the top perforation 212 for the tear strip of the label substrate 210, and a bottom portion 225 of the liner substrate 220 that extends below the bottom perforation 212 for the tear strip of the label substrate 210.

Combination 200 provides increased tensile strength in the combination 200 around an area defined by the tear strip in the label substrate and the bottom portion 225 of the liner substrate 220 such that during press application the combination 200 around the tear strip in the label substrate 210 and the liner tear strip 222 do not separate or break.

This is different from the convention combination 100 in that there is a supporting top portion 224 in the liner substrate 220 and ties 221 along that correspond to both the top perforations 212 and bottom perforations 212 for the tear strip of the label substrate 210. These elements provide structural support in the combination 200, and these elements of 200 do not exist in existing 2S zipper-based label-liner combinations 100.

Existing combinations 100 could not add top ties 221 because the top portion of the liner was also the inner edge of the border, such that no perforations were capable of being added in order to still have a clean removal of the border. Combination 200 logically separates the liner substrate into a top portion 224 and a bottom portion 225 via liner tear strip 222 (defined by ties 221), such that the top of the liner substrate 220 is no longer adjacent to or aligned with the tear strip defined by perforations 212 or label substrate 210.

Additionally, because of the added structural support provided by top portion 224 and dual ties 221 (top and bottom for perforations 212), the distance between the offset between each perforation 212 and its corresponding label substrate ties 221 can be increased or doubled from what has been conventionally achieved.

Figure 2B:
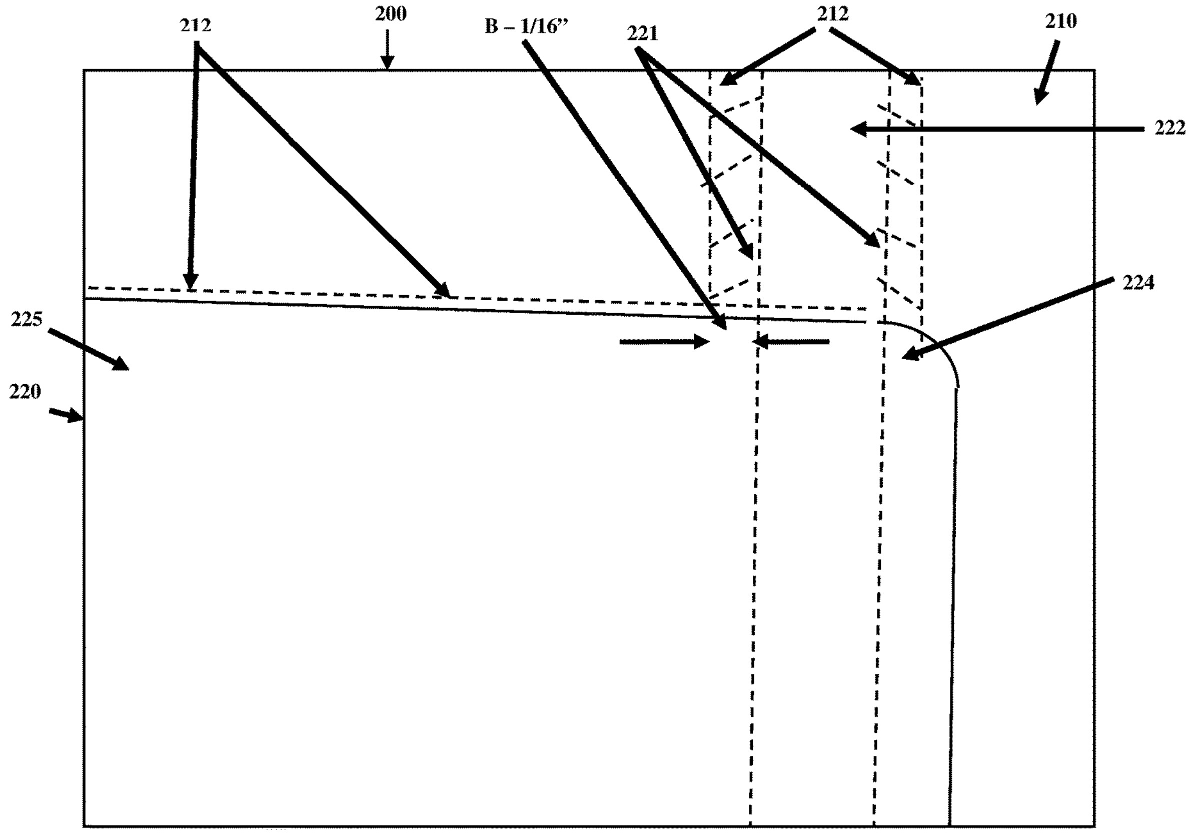
FIG. 2B is a diagram of the 2S zipper label-liner combination of FIG. 2A that depicts an increased distance between the zipper perforation in the label substrate and the offset liner perforation in the liner substrate from the distance was achieved in an existing 2S zipper label-liner combination (depicted in FIG. 1D), according to an example embodiment.

FIG. 2B is a diagram of the 2S zipper label-liner combination 200 of FIG. 2A that depicts an increased distance (1/16 of an inch) between the zipper perforations 212 in the label substrate 210 and the offset liner ties 221 in the liner substrate 220 from the distance (1/32 of an inch) that was achieved in an existing 2S zipper label-liner combination 100 (depicted in FIG. 1D), according to an example embodiment.

FIG. 2B illustrates an image of a ruler similar to what was shown for the conventional combination 100 in FIG. 1D. The two sideway arrows pointed to by B is intended to show that the distance in the offset between label tear strip perforation 212 and ties 221 is 1/16 of an inch or approximately double the distance for the conventional combination 100 (depicted in FIG. 1D). This also provides added structural integrity to combination 200 and ensures when a recipient pulls tab 223 both the tear strip defined by label perforations 212 and ties 221 defining liner tear strip 222 are removed together without tearing or ripping any portion of the label substrate 210 corresponding to liner bottom portion 225.

Thus, not only is the manufacturing integrity improved by combination 200 but usability, quality, and function of combination 200 is also improved over combination 100.

In an embodiment, label substrate 210 is coated with a thermal sensitive coating on both a front side of substrate 210 and a backside of label substrate 210. Thus, combination 200 is a 2S terminal (2ST) label-liner combination. The two thermal sensitive coatings can be direct thermal sensitive coatings, thermal transfer receptive coatings, or a combination of a direct thermal sensitive coating on one side and a thermal transfer receptive coating on the other side opposite side.

In an embodiment, a backside of border portion 211 of the label substrate 210 is coated with an adhesive. The adhesive can be activated by pressure or by heat. Moreover, the adhesive can be uniformly applied on the backside of border portion 211 or applied in patches or patterns of patches on the backside of border portion 211.

Figure 3:
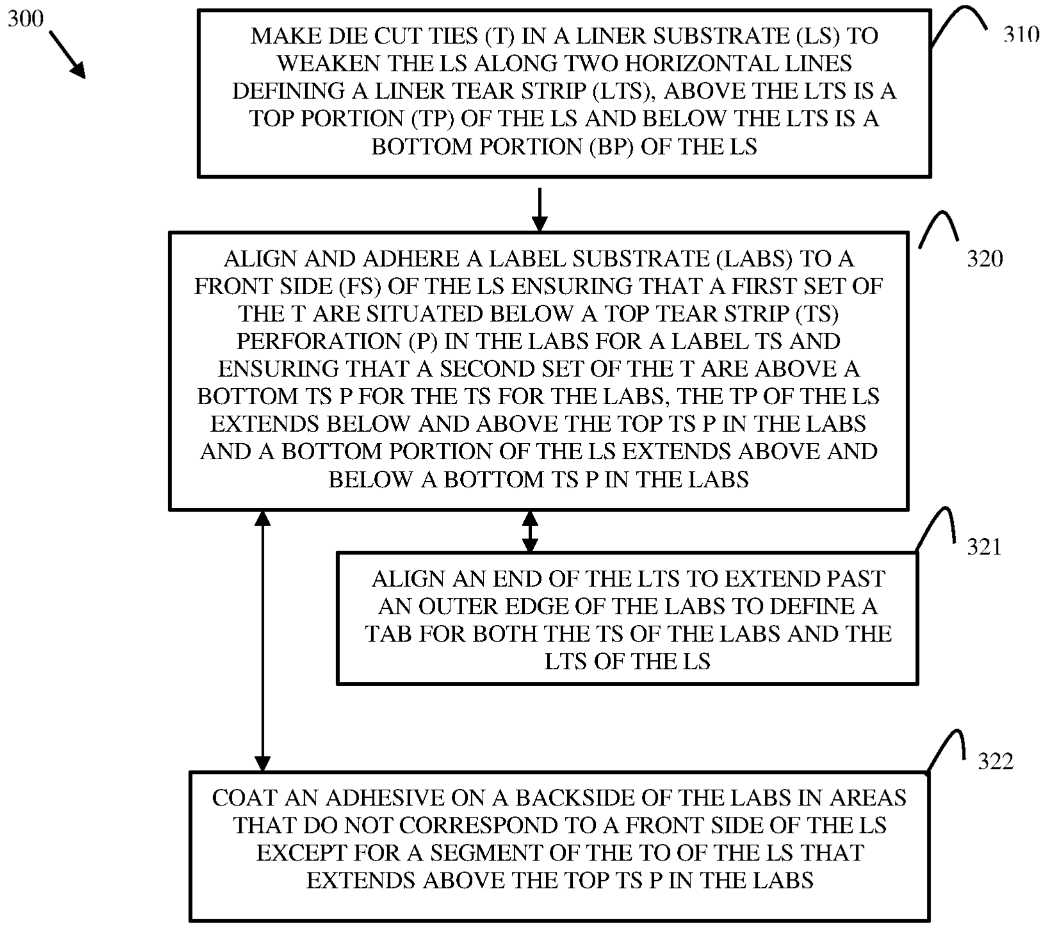
FIG. 3 is a diagram of a method 800 for manufacturing combination 200, according to an example embodiment.

FIG. 3 is a diagram of a method 800 for manufacturing combination 200, according to an example embodiment. The method is operated by software/firmware of a press, the software/firmware executed by a processor of the press from a non-transitory computer-readable medium of the press.

At 310, the press makes die cut ties in a liner substrate to weaken the liner substrate along two horizontal lines defining a liner tear strip, above the liner tear strip is a top portion of the liner substrate and below the liner tear strip is a bottom portion of the liner substrate; and At 320, the press aligns and adheres a label substrate to the front side of the liner substrate ensuring that a first set of the die cut ties are situated below a top tear strip perforation in the label substrate for a label tear strip and ensuring that a second set of the die cut ties are situated above a bottom tear strip perforation for the label substrate. The top portion of the liner substrate extends below and above the top tear strip perforation in the label substrate and the bottom portion of the liner substrate extends above and below a bottom tear strip perforation in the label substrate.

In an embodiment, at 321, the press aligns an end of the liner tear strip to extend past an outer edge of the label substrate to define a tab for both the tear strip of the label substrate and the liner tear strip of the liner substrate.

In an embodiment, at 322, the press coats adhesive on the backside of the label substrate not corresponding to the front side of the liner substrate except for a segment of the top portion of the liner substrate that extends above the top tear strip perforation in the label substrate.

In an embodiment, the label substrate is coated on both sides with a thermal sensitive coating for thermal imaging of both sides of the label substrate by a terminal printer before being processed by the press.

In an embodiment, the press coats both sides of the label substrate with a thermal sensitive coating before 310 or independent and simultaneous with 310 but before 320.

In an embodiment, the press makes the top tear strip perforation and the bottom tear strip perforation in the label substrate before 320 and the press further makes additional perforations in the label substrate that correspond to an outline of the bottom portion of the liner substrate.

Although the present invention has been described with particular reference to certain preferred embodiments thereof, variations and modifications of the present invention can be affected within the spirit and scope of the following claims.

The invention claimed is:

1. A label-liner combination, comprising:

a liner substrate comprising two horizontal die cuts through the liner substrate, the two horizontal die cuts define a top portion of the liner substrate, a bottom portion of the liner substrate, wherein the two horizontal die cuts further define and a liner tear strip within the liner substrate that separates the top portion of the liner substrate from the bottom portion of the liner substrate;

a label substrate comprising two horizontal perforations through the label substrate and aligning to the two horizontal die cuts, wherein the two horizontal perforations define a label tear strip and includes two or more additional die cuts corresponding to an outline of three sides of the bottom portion of the liner substrate;

wherein a top one of the two horizontal die cuts sits under a top one of the two horizontal perforations;

wherein a bottom one of the two horizontal dies cuts sits above a bottom one of the two horizontal perforations;

wherein the liner tear strip and label tear strip combine to form a liner-label tear strip and an end portion of the liner-label tear strip extends beyond an outer edge of the label substrate to define a tab for removal of both the label tear strip and the liner tear strip.

2. The label-liner combination of claim 1, wherein liner tear strip extends for a length of the two horizontal perforations under the label tear strip.

3. The label-liner combination of claim 1, wherein the liner substrate is adapted to be separated into the bottom portion, the top portion, and the liner tear strip when the liner tear strip is removed from the label-liner combination with the label tear strip.

4. The label-liner combination of claim 1, wherein the top portion of the liner substrate and the bottom portion of the liner substrate are substantially centered on a backside of the label substrate with the liner tear strip aligned to the label tear strip to form the label-liner combination.

5. The label-liner combination of claim 1, wherein a backside of the label substrate corresponding to the bottom portion of the liner substrate is free of any adhesive.

6. The label-liner combination of claim 1, wherein the top portion of the liner substrate extends above and below the top one of the two horizontal perforations along a backside of the label substrate, wherein the bottom portion of the liner substrate extends above and below the bottom one of the two horizontal perforations along the backside of the label substrate.

* * * * *